(12) United States Patent
Kumar et al.

(10) Patent No.: US 12,321,708 B2
(45) Date of Patent: Jun. 3, 2025

(54) GENERATING AN AI CONVERSATION MODEL USING API TEST DATA

(71) Applicant: International Business Machines Corporation, Armonk, NY (US)

(72) Inventors: Balaji Sankar Kumar, Bangalore (IN); Vamshi Dondapati, Hyderabad (IN); Vidya Chandrashekar, Bangalore (IN); Bindu Tank, Udaipur (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 286 days.

(21) Appl. No.: 18/117,142

(22) Filed: Mar. 3, 2023

(65) Prior Publication Data
US 2024/0296292 A1 Sep. 5, 2024

(51) Int. Cl.
G06F 40/20 (2020.01)
G06F 9/54 (2006.01)
G06F 16/334 (2025.01)
G06F 40/205 (2020.01)
G06F 40/253 (2020.01)
G06F 40/284 (2020.01)
G06F 40/35 (2020.01)

(52) U.S. Cl.
CPC ............... *G06F 40/35* (2020.01); *G06F 9/54* (2013.01); *G06F 16/3344* (2019.01); *G06F 40/205* (2020.01); *G06F 40/253* (2020.01); *G06F 40/284* (2020.01)

(58) Field of Classification Search
CPC .............................. G06F 40/35; G06F 40/205
See application file for complete search history.

(56) References Cited

U.S. PATENT DOCUMENTS

| | | | |
|---|---|---|---|
| 10,515,002 B2 | 12/2019 | Takawale et al. | |
| 10,831,564 B2 | 11/2020 | Dimascio et al. | |
| 11,321,054 B2 | 5/2022 | Gaitonde et al. | |
| 2004/0133881 A1* | 7/2004 | Chamberlain | G06F 11/3684 717/125 |
| 2018/0349256 A1* | 12/2018 | Fong | G06F 40/284 |
| 2019/0188056 A1 | 6/2019 | Dimascio et al. | |
| 2021/0081819 A1 | 3/2021 | Polleri et al. | |
| 2022/0308918 A1 | 9/2022 | Pandey et al. | |

* cited by examiner

*Primary Examiner* — Ibrahim Siddo
(74) *Attorney, Agent, or Firm* — Garg Law Firm, PLLC; Rakesh Garg; Kristofer Haggerty

(57) ABSTRACT

An embodiment includes generating an intent representative of a verb identified in application programming interface (API) test data associated with an API test case. The embodiment also generates a first entity representative of a first noun identified in the API test data and a second entity representative of a second noun identified in the API test data. The embodiment identifies the intent as being associated with a relationship between the first and second entities in the API test case. The embodiment generates a relationship model associated with the API test case, where the relationship model includes the intent as the relationship between the first entity and the second entity. The embodiment generates a conversation model of an artificial intelligence (AI) conversation agent by mapping the intent and the first and second entities to dialog nodes of the conversation model.

20 Claims, 16 Drawing Sheets

GENERATING AN AI CONVERSATION MODEL USING API TEST DATA

BACKGROUND

The present invention relates generally to conversational artificial intelligence (AI) computer systems and software for use therewith. More particularly, the present invention relates to a method, system, and computer program for generating an AI conversation model using application programming interface (API) test data.

An application programming interface (API) can be a set of subroutine definitions, protocols, tools, or the like for building application software. More generally, an API is a set of clearly defined methods of communication between various software components. An API can provide the building blocks for developing a computer program in the form of an API specification which may include routines, data structures, object classes, variable, remotes calls, and so forth.

SUMMARY

The illustrative embodiments provide for generating an AI conversation model using application programming interface (API) test data. An embodiment includes generating an intent representative of a verb identified in API test data associated with an API test case. The embodiment also includes generating a first entity representative of a first noun identified in the API test data and a second entity representative of a second noun identified in the API test data associated with the API test case. The embodiment also includes identifying the intent as being associated with a relationship between the first entity and the second entity in the API test case. The embodiment also includes generating a first relationship model associated with the API test case, where the relationship model comprises the intent as the relationship between the first entity and the second entity. The embodiment also includes generating a conversation model of an AI conversation agent by mapping the intent and the first and second entities to dialog nodes of the conversation model. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

DETAILED DESCRIPTION

Figure 1:
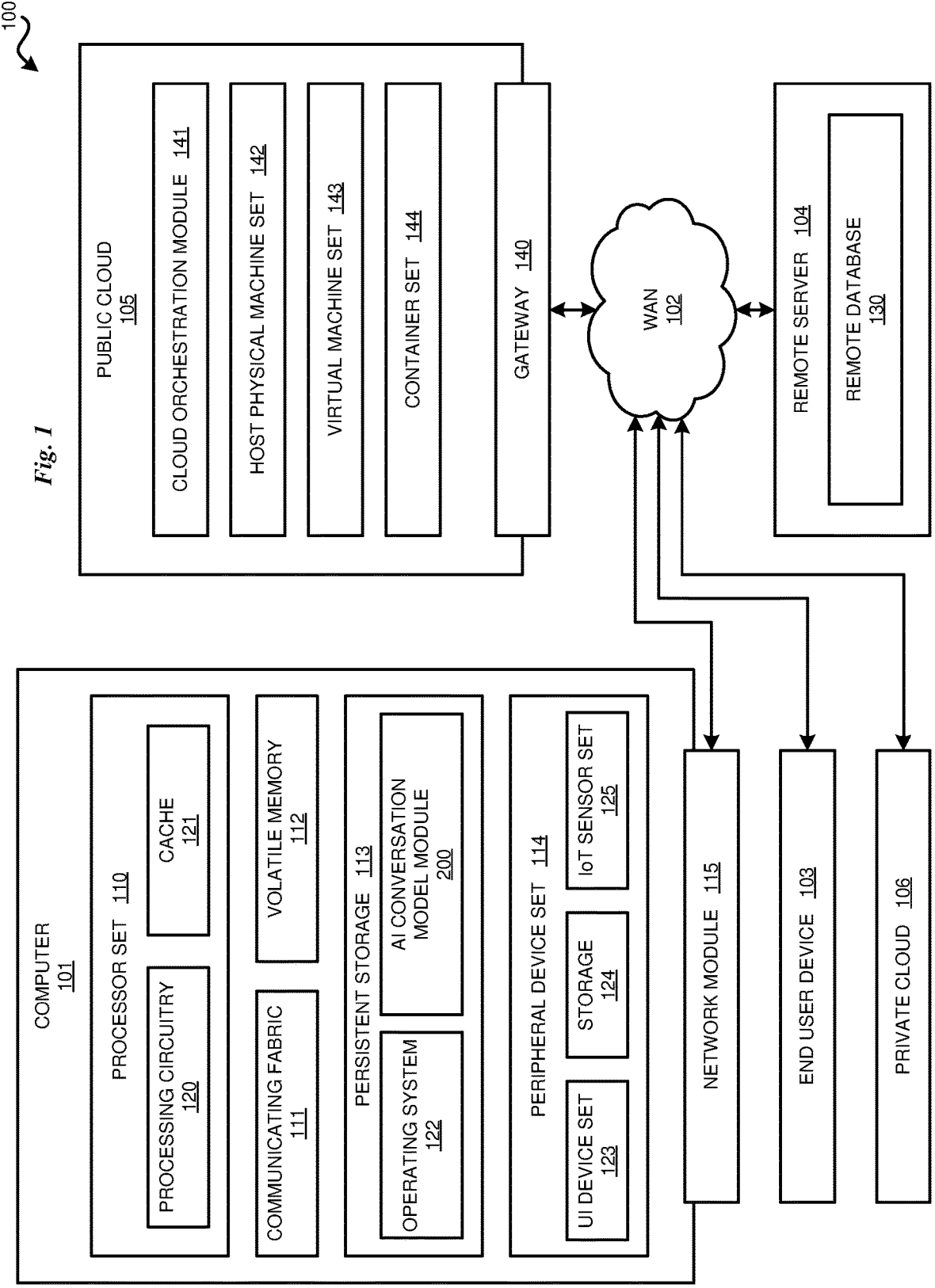
FIG. 1 depicts a block diagram of a computing environment in accordance with an illustrative embodiment.

Applications increasingly use APIs to programmatically interact with a growing variety of publicly accessible Web services. One reason for this growth is that many businesses have begun to realize the many advantages to opening an API to their users. These advantages include, for example, enabling professional services revenue and increasing product revenue. An open API can also provide increased value to customers who benefit from better access to information and services.

However, there are technical challenges involved in introducing an open API. One such challenge involves performing extensive tests against the API to confirm proper operation and security. Operational testing usually includes issuing service calls to the API and verifying that the API responds as expected. The service calls are organized into test cases, where a test case has been created for each service call being tested. A sequence is then created for each test case. The sequence specifies a series of operations associated with the service call. For example, a test case may be created for a service call that is intended to be used to create a new project. The test case in this example may have a sequence that includes issuing a GET request with a project name to the API, then receiving an HTTP status 201 response with the project name and a project ID. These types of test cases are often created, and the corresponding tests are performed, as part of the process of developing an API.

Another technical challenge involved in introducing an open API is finding ways to provide adequate documentation and support to developers who want to use the API. Developers must be able to understand an API to correctly invoke it. Developers will often be reluctant to integrate an API into an application if the API appears to be poorly documented and support appears to be lacking.

There have been considerable advances in a myriad of AI technologies in recent years. These advances have garnered significant attention, with many businesses now looking for ways to leverage AI-based solutions to overcome challenges. One such solution involves the addition of AI conversation agents, also referred to as virtual assistants or chat bots, to provide improved customer assistance. As companies look for ways to provide improved support for developers invoking their public API, many have considered including AI agents to their API support services.

AI conversation agents communicate with users via natural-language dialogue and may operate through a web page, a phone, or a messaging system. They are usually trained to recognize questions that users are anticipated to ask, and then to also provide answers to such questions. This presents significant technical challenges involved in trying to find ways to train an AI agent recognize such a wide range of possible question and provide accurate and relevant answers. However, AI conversation agents are difficult and time-consuming to manually build. This can be especially true for highly technical scenarios, such as providing API support.

Illustrative embodiments recognize that there is a need to improve systems and processes that support the training and generation of AI conversation agents. Current systems that rely on contemplation by subject matter experts and manual entry of intents are time consuming and prone to human error. Exemplary embodiments improve systems and processes for training and generating AI conversation agents by allowing for the creation of an AI conversation model directly from API test cases. This eliminates the various manual processes previously involved, which in turn significantly reduces the time and system resources required and improves the quality of the resulting conversation model compared to models resulting from prior systems and processes.

In an exemplary embodiment, a process for generating an AI conversation model using API test data builds a corpus from API-related data, including API test data and other API documentation. The process generates intents and entities from the API-related data. The process then generates a relationship model using the intents and entities, along with test cases from the API-related data. Then the process generates dialog nodes from the relationship model and maps the dialog nodes to a conversational chat schema of an AI conversation agent.

In an exemplary embodiment, the building of the corpus includes identifying test scenarios in the API-related data. A test scenario refers to a collection of one or more API test cases. Operational testing is usually performed on an API before the API is released to the public. A common technique for API testing involves the use of test scenarios. A test scenario is a series of steps a user may take to complete a task, and usually includes positive cases in which a user takes the expected actions and negative cases in which a user does not take the expected steps. Non-limiting examples of test cases that will be referred to herein for explanatory purposes are shown in Table 1:

TABLE 1

| Test Case | Description |
| --- | --- |
| Positive Test Case | Create a project |
| | Create member to project |
| | verify member added to the project |
| Negative Test Case | Create a project |
| | Member creation on invalid project returns PROJECT_NOT_FOUND |

In the case of an API, the series of steps will include one or more API service calls. One technique is to create a separate test case for each service call being tested, and then group the test cases according to related service calls into test scenarios. In other situations, more than one service call may be included in a test case.

The test cases and test scenarios are typically documented, for example, in a test specification that includes test data and metadata. The test specification includes a list of test scenarios, and for each test scenario, a description of the scenario and several test cases. Then, for each test case, the test specification may include a description, pre-conditions that need to be met before executing the test case, a list of test steps in the order they should be executed, data that is needed as an input for test cases, expected results, and post conditions that should be achieved by the test. In some embodiments, the process uses natural language processing (NLP) parsing of a test specification to identify test scenarios and test cases.

A sequence is then created for each test case. The sequence specifies a series of operations associated with the service call. As a non-limiting example, Table 2 shows an example of test case sequences for the positive test case of Table 1, and Table 3 shows an example of test case sequences for the negative test case of Table 1.

TABLE 2

| Test Case Steps | Intents | Entities |
| --- | --- | --- |
| Create a project | How to create | request: projects, name |
| | How to add | response: ID, HTTP code |
| | How to make | 201, HTTP status 201 |
| | Create a new | |
| | Example to create | |
| Create member to project | How to create | request: projects, members, name |
| | How to add | name |
| | How to make | response: id, name, http code |
| | Create a new | 201, http status 201 |
| | Example to create | |
| Verify member added to project | Verify or Validate or Confirm | request: pid, mid, members response: id, name, http code 200, http status, 200 |

TABLE 3

| Test Case Steps | Intents | Entities |
| --- | --- | --- |
| Create a project | How to create | request: projects, name |
| | How to add | response: ID, HTTP code 201, |
| | How to make | HTTP status 201 |
| | Create a new | |
| | Example to create | |

TABLE 3-continued

| Test Case Steps | Intents | Entities |
| --- | --- | --- |
| Create member to an invalid project result in 404 | Failing at create Not working at create Getting error while create | request: name, pid, members response: id, code, PROJECT_NOT_FOUND, http code 404, http status 404 |

A test scenario may be created for service calls used for setting up a new project that involves a service call for creating the project and another service call for creating a new member of the project. In this example, a first test case is created for the service call that is used to create the new project, and a second test case is created for the service call that is used to create the new member of the project. This example may then have a sequence that includes issuing a GET request with a project name to the API, then receiving an HTTP status 201 response with the project name and a project ID. This test case may be grouped into a test scenario with another test case for creating a new member of the project.

An exemplary embodiment includes concrete extractors for different test feeds (REST API based, JEST based, etc.), which process the test data for description, request, response, metadata (whether it is a positive or negative test case) in all test cases and test scenarios and generates intents, entities and dialogs. Entities are the generally the product features and attributes of the product features (e.g., user, member, tickets). Intents are the type actions performed on the features (e.g., how to create, add new, create new). Dialog nodes build relationships between the Entities and Intents (e.g., how to create user, add new member, create new ticket). In some embodiments, intents and entities are also extracted from other available sources, such as API product documentation.

In an exemplary embodiment, the process identifies intents by identifying primary verbs in the corpus and identifies entities by identifying nouns in the corpus. The process identifies verbs and nouns for each test case step. Referring to the example in Table 1, for the positive test case there are three steps: 1. Create a project; 2. Create member to project; and 3. Verify member added to project. The primary verbs for the first two steps are "create" and for the third step is "verify."

The entities are then identified in each scenario by processing the text and/or objects in the API test data. Referring to the example in Table 2 above (positive test case), the process gets all the object ids from the request and response body, then classifies the identified entities based on the requests and responses. For example, for "Create a project" the entities would be projects, name, id, http code, http status, 201.

In some embodiments, the process uses NLP processing to identify parts of speech of words in the corpus. In some embodiments, the process includes tokenizing the corpus, which involves converting a sequence of characters into a sequence of tokens. Tokens may be string of characters typed by a user and categorized as a meaningful symbol. Further, in certain embodiments, tokenizing includes identifying word boundaries in the corpus and breaking sentences into their component parts such as words, multiword tokens, numbers, and punctuation marks. In some embodiments, the tokenizing includes receiving a string of characters, identifying the lexemes in the string, and categorizing them into tokens.

In some embodiments, the process includes part-of-speech (POS) tagging in which the process marks up a word in the corpus to correspond to a particular part of speech. In some embodiments, the POS tagging includes assigning a part of speech to each word or other token in the corpus. In some embodiments, the POS tagging includes determining the part of speech to which a word corresponds based on the definition of the word and the context of the word. The context of a word may be based on its relationship with adjacent and related words in a phrase, sentence, question, or paragraph. In certain embodiments, the context of a word may be dependent on one or more previous words. Examples of parts of speech that may be assigned to words include, but are not limited to, nouns, verbs, adjectives, adverbs, and the like. Examples of other part of speech categories that the process may assign include, but are not limited to, comparative or superlative adverbs, wh-adverbs, conjunctions, determiners, negative particles, possessive markers, prepositions, wh-pronouns, and the like.

In an exemplary embodiment, the process finds synonyms for identified primary verbs for each test case step. In some embodiments, the process includes deriving synonyms for verbs using synonym network tools of WordNet and VerbNet of the Natural Language Toolkit (NLTK).

In an exemplary embodiment, the process loads a predetermined list of partial intents. The predetermined list of partial intents includes a static list of basic intents (without a primary verb) for intent generation. A non-limiting example of a basic intents list may include:

How to
Example for
Failing with
Getting error
Not working

The list of partial intents includes several phrases that a user may uses to begin a question. While five examples are shown, actual implementations may include dozens or hundreds of such phrases. In some embodiments, this list will be absorbed into the corpus as a dictionary or preloaded template. The process combines the primary verbs and synonyms with the partial intents for each test case step, and the resulting combinations are designated as intents for the model being generated.

In an exemplary embodiment, the process classifies each of the nouns as being associated with a request and/or a response for each test case step. In some embodiments, the NLP processing includes determining a context of a noun based on surrounding words, and then classifying the context as a request or a response for each step. The process designates the resulting classified nouns as entities for the model being generated.

In an exemplary embodiment, once the process has identified the intents and entities for each of the test cases/scenarios, the process then generates relationship models for each of the test cases that align with the steps of the test cases. The relationship models can then be used to generate dialog nodes for an AI conversation schema that also aligns with the steps of the test cases, thereby allowing the chatbot to address likely queries related to the API. In some embodiments, the relationship model being generated may be capable of responding to multiple types of queries. As a non-limiting example, a relationship model may be generated that is configured to respond to three types of queries summarized in Table 4.

TABLE 4

| Type | Description |
|---|---|
| 1 | Understanding the product functionality for the scenarios<br>For this type of question, the chat-bot consumer expects a functionality overview.<br>Example:<br>Query: What are the steps to create a member in a project?<br>Expected reply: To create a member, the project is a pre-requisite for it |
| 2 | Understanding the product interaction behavior<br>For this type of question, the chat-bot consumer expects the details on how to interact with the API, i.e., what to pass and what to expect as response<br>Example:<br>Query: How do I create a member in a project?<br>Expected reply: To create a member, pass the name in the request body and PID in the path parameter. On successful creation of member the response code will be API development environment 201 with id and name in the response. |
| 3 | Debugging the failures with product interactions<br>For this type of question, the chat-bot consumer expects the reason for the failure and additionally the steps to execute the task successfully.<br>Example:<br>Query: I'm getting 404 while creating the member in a project<br>Expected reply: The reason for 404 could be PROJECT_NOT_FOUND. This would happen when the member is created with an invalid project or a project ID that does not exist.<br>Continued conversation: The above response gives some information to the developer about the failure. But that's not enough here. The developer should also be given a suggestion for steps to overcome the failure.<br>Continued reply: To create a member in a project, create a project by invoking/project by passing the name in the body. The response will be HTTP Code: 201 with an ID and name in the response. Now to create a member invoke/project/{PID}/member by passing the name in the body and the PID in the path parameter. The response will be name and ID with HTTP Code: 201 |

In an exemplary embodiment, the process generates a relationship model as a graph by first generating a node for each entity in the present test case. The process then generates edges from intents connecting the entity nodes.

The process generates different relationship models for each of the three query types. Specifically, the process generates the nodes differently depending on the query type. For Type 1, the process generates a node for each step of the test of the current test case being processed. For Type 2, the process generates a node for each identified entity of the positive scenario for the current test case being processed. For Type 3, the process generates a node for each identified entity of the negative scenario for the current test case being processed, and then also generates a node for each identified entity of the corresponding positive scenario. This allows for the continued conversational bot to suggest a solution to the problem.

In an exemplary embodiment, once the relationship model (s) have been generated, the process extracts relationships and generates dialog nodes. In some embodiments, the process generates a top-level dialog nodes for the identified intents of each scenario. Then, entities are mapped as child nodes to the intent parent node for each scenario. Finally, a last leaf node is added that will be the response of the AI conversation agent in the schema. In some embodiments, the last leaf node is a coded response such that the response is hardcoded in the dialog schema. Alternatively, the last leaf node is a coded response that pulls data from a dynamic source (like webhooks) or data composed from the product documentation.

In an exemplary embodiment, the process builds the conversational AI model using the intents, entities, and dialog nodes. The process collates the intents and adds them to the AI model. The process collates and adds entities and entity synonyms to the AI model. The process then codes each relationship model as separate dialog nodes in the AI model, and codes continued conversation as an extension to dialog nodes for the negative query types.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as an improved conversational model module 200 that generates an AI conversation model using API test data. In addition to conversational model module 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and conversational model module 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in conversational model module 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in conversational model module 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
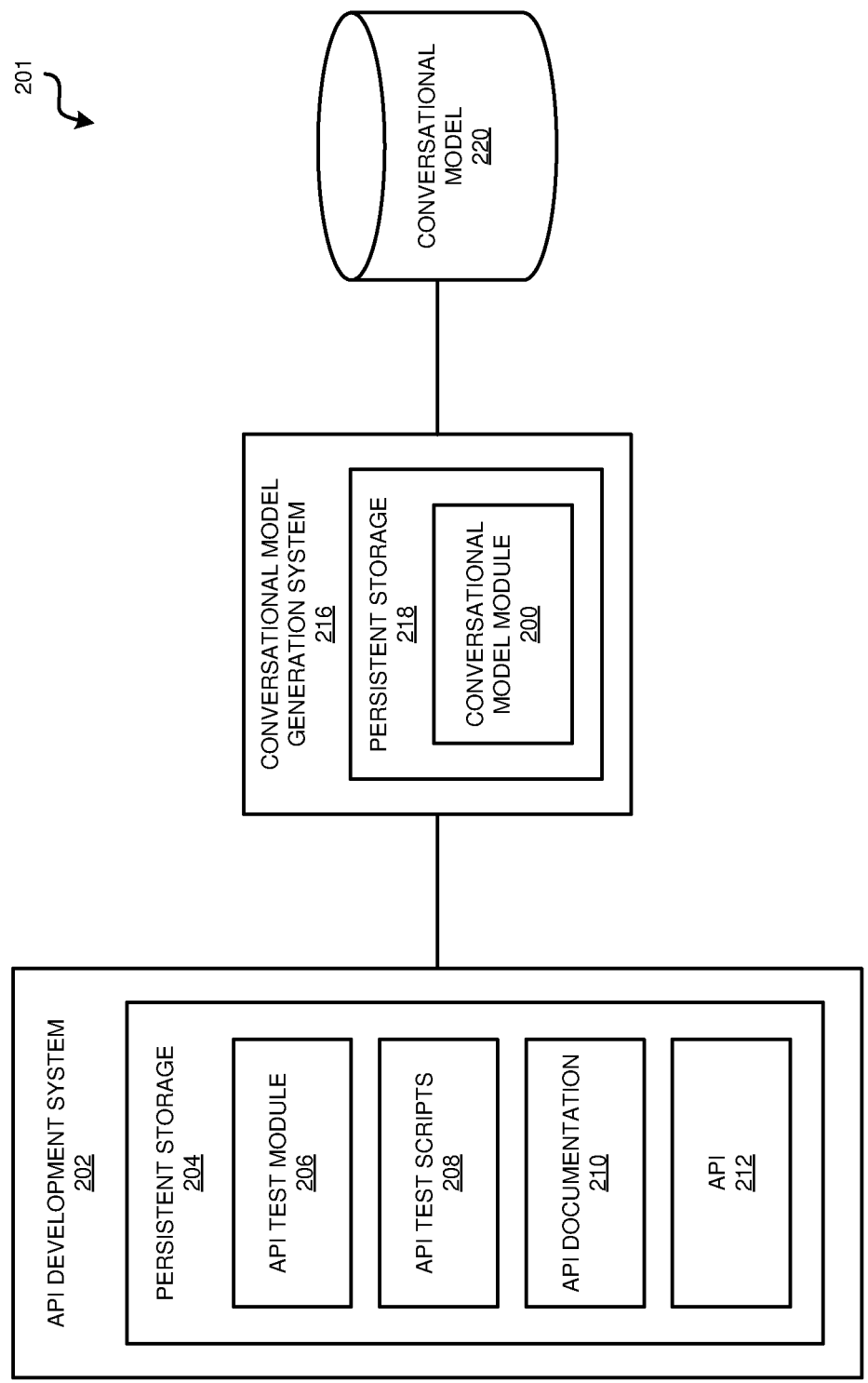
FIG. 2 depicts a block diagram of an exemplary API development environment in accordance with an illustrative embodiment.

With reference to FIG. 2, this figure depicts a block diagram of an exemplary API development environment 201 in accordance with an illustrative embodiment. The API development environment 201 includes an API development system 202 that provides various forms of API information to a conversational model generation system 216 that, in turn, generates a conversational model 220 for an AI conversation agent or chatbot. In an exemplary embodiment, the conversational model generation system 216 is an example of the computer 101 of FIG. 1, with the persistent storage 218 being an example of the persistent storage 113 storing computer readable program instruction for the conversational model module 200 of FIG. 1.

In the illustrated embodiment, the API development system 202 comprises a persistent storage 204. The description of the persistent storage 113 of FIG. 1 applies equally to the persistent storage 204 except that the persistent storage 204 stores program instructions for an API test module 206, as well as various API test scripts 208, various forms of API documentation 210, and at least some of the code for an API 212. For example, API 212 may be a development version used for testing and updating prior to deployment in a production environment.

In order to generated a conversational model 220 for an AI conversation agent, the API development system 202 provides various types of API-related data to the conversational model generation system 216. In exemplary embodiments, the conversational model generation system 216 processes the received API-related data according to various embodiments disclosed herein. The conversational model generation system 216 applies natural language processing techniques to the API-related data to identify intents and entities. The conversational model generation system 216 uses the identified intents and entities to build relationship models corresponding to various test cases used to test the API 212. The relationship models are then mapped to a basic framework to construct the conversational model 220, which can then be deployed for an AI conversation agent.

Figure 3:
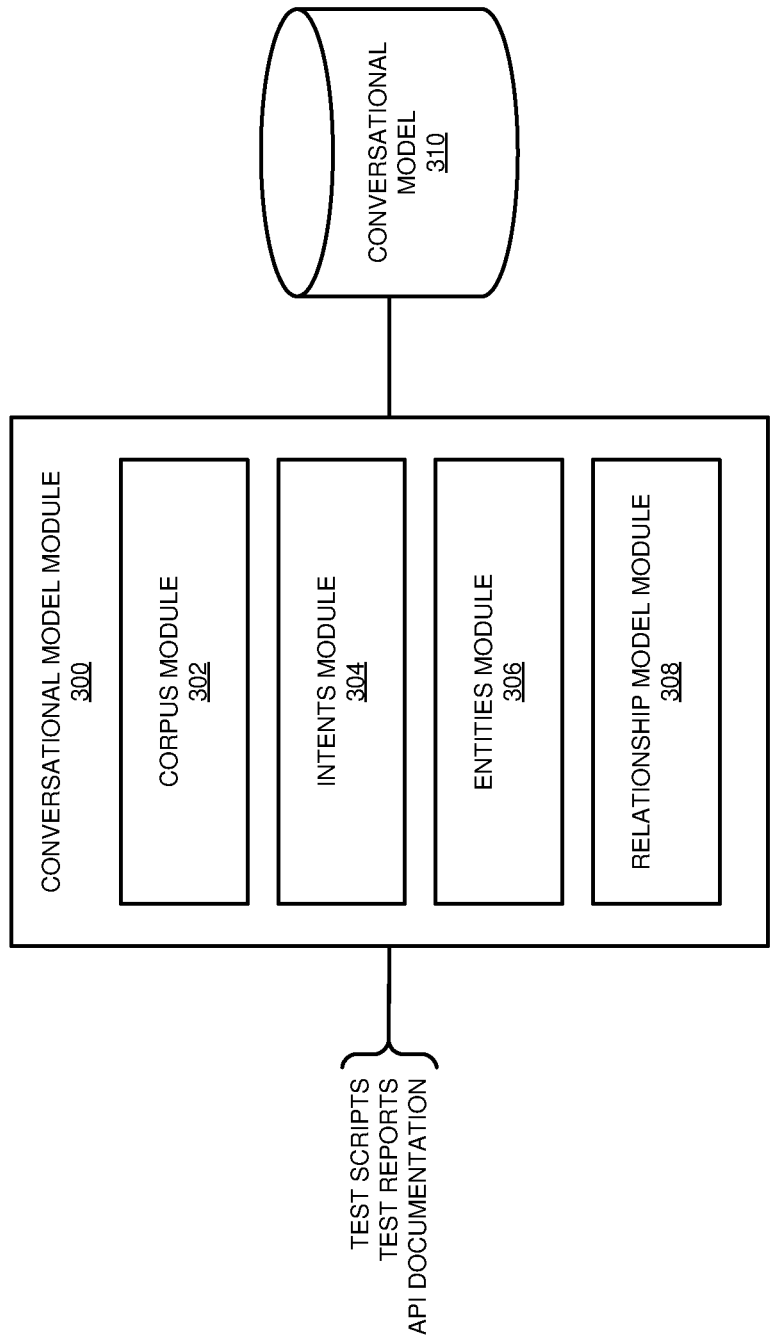
FIG. 3 depicts a block diagram of an exemplary conversational model module in accordance with an illustrative embodiment.

With reference to FIG. 3, this figure depicts a block diagram of an exemplary conversational model module 300 in accordance with an illustrative embodiment. In an exemplary embodiment, the conversational model module 300 is an example of the conversational model module 200 of FIGS. 1 and 2.

In the illustrated embodiment, the conversational model module 300 includes a corpus module 302, an intents module 304, an entities module 306, and a relationship model module 308. In alternative embodiments, the migration management system 201 can include some or all of the functionality described herein but grouped differently into one or more systems or modules. In some embodiments, the functionality described herein is distributed among a plurality of systems, which can include combinations of software and/or hardware-based systems, for example Application-Specific Integrated Circuits (ASICs), computer programs, or smart phone applications.

In some embodiments, the corpus module 302 builds a corpus from various types of API-related data. In various embodiments, the API-related data may include API test data and/or other types of API documentation, such as an API specification, API metadata, and/or other types of descriptions or information about the API. including API test scenarios. In some embodiments, the corpus module 302 identifies scenarios in the API-related data using NLP processing. The corpus module 302 then appends each scenario to the corpus, including the scenario description, test scenario metadata, test data that identifies test cases.

In some embodiments, the intents module 304 identifies primary verbs in the corpus for each test case step. In some embodiments, the intents module 304 performs NLP processing to identify parts of speech of words in the corpus. In some embodiments, the intents module 304 tokenizes the corpus, which involves converting a sequence of characters into a sequence of tokens. Tokens may be string of characters typed by a user and categorized as a meaningful symbol. Further, in certain embodiments, tokenizing includes identifying word boundaries in the corpus and breaking sentences into their component parts such as words, multiword tokens, numbers, and punctuation marks. In some embodiments, the tokenizing includes receiving a string of characters, identifying the lexemes in the string, and categorizing them into tokens.

In some embodiments, the intents module 304 performs part-of-speech (POS) tagging in which the intents module 304 marks up a word in the corpus to correspond to a particular part of speech. In some embodiments, the POS tagging includes assigning a part of speech to each word or other token in the corpus. In some embodiments, the POS tagging includes determining the part of speech to which a word corresponds based on the definition of the word and the context of the word. The context of a word may be based on its relationship with adjacent and related words in a phrase, sentence, question, or paragraph. In certain embodiments, the context of a word may be dependent on one or more previous words. Examples of parts of speech that the intents module 304 may assign to words include, but are not limited to, nouns, verbs, adjectives, adverbs, and the like. Examples of other part of speech categories that the intents module 304 may assign include, but are not limited to, comparative or superlative adverbs, wh-adverbs, conjunctions, determiners, negative particles, possessive markers, prepositions, wh-pronouns, and the like.

In some embodiments, the intents module 304 finds synonyms for identified primary verbs for each test case step. In some embodiments, the intents module 304 derives synonyms for verbs using synonym network tools of Word-Net and VerbNet of the Natural Language Toolkit (NLTK).

In some embodiments, the intents module 304 loads a predetermined list of partial intents. The predetermined list of partial intents includes a static list of basic intents (without a primary verb) for intent generation. A non-limiting example of a basic intents list may include:

How to
Example for
Failing with
Getting error
Not working

The list of partial intents includes several phrases that a user may uses to begin a question. While five examples are shown, actual implementations may include dozens or hundreds of such phrases. In some embodiments, this list will be absorbed into the corpus as a dictionary or preloaded template.

In some embodiments, the intents module 304 combines the primary verbs and synonyms with the partial intents for each test case step and the resulting combinations are designated as intents for the model being generated.

In some embodiments, the entities module 306 identifies nouns in the corpus for each test case step. In some embodiments, the results of the NLP processing performed by the intents module 304 are used by the entities module 306 to identify the nouns.

In some embodiments, the entities module 306 classifies nouns as being associated with a request and/or a response for each test case step. In some embodiments, the entities module 306 uses NLP processing to determine a context of a noun based on surrounding words, and then classifies the context as request or response for each step. The entities module 306 then designates the classified nouns as entities for the model being generated.

In some embodiments, the relationship model module 308 generates relationship models for each of the test cases and query types using the intents identified by the intents module 304 and using the entities identified by the entities module 306.

In some embodiments, the relationship model module 308 a graph for each test case of each scenario and query type. For a given test case, the relationship model module 308 generates a node for each entity in the test case, and then generates edges based on the identified intents, and connects entity nodes with the edges having associated intents.

In some embodiments, the relationship model module 308 the nodes of the relationship model are generated in different ways depending on the query type. For Type 1, the relationship model module 308 generates a node for each step of the test of the current test case being processed. For Type 2, the relationship model module 308 generates a node for each identified entity of the positive scenario for the current test case being processed.

For Type 3, the relationship model module 308 generates a node for each identified entity of the negative scenario for the current test case being processed. The relationship model module 308 then identifies the corresponding positive scenario for the current test case being processed and generates a node for each identified entity of the identified corresponding positive scenario.

In some embodiments, the conversational model module 300 outputs the relationship models as the conversational model 310. Alternatively, in some embodiments, the conversational model module 300 generates a conversational model from the relationship models. In some such embodiments, once the relationship model(s) have been generated, the conversational model module 300 extracts relationships and generates dialog nodes. In some embodiments, the conversational model module 300 generates a top level dialog nodes for the identified intents of each scenario. Then, the conversational model module 300 maps entities as child nodes to the intent parent node for each scenario. Finally, the conversational model module 300 adds a last leaf node that will be the response of the AI conversation agent in the schema. In some embodiments, the last leaf node is a coded response such that the response is hardcoded in the dialog schema. Alternatively, the last leaf node is a coded response that pulls data from a dynamic source (like webhooks), or data composed from the product documentation.

In some embodiments, the conversational model module 300 builds a conversational AI model using the intents, entities, and dialog nodes. The conversational model module 300 collates the intents and adds them to the AI model. The conversational model module 300 collates and adds entities and entity synonyms to the AI model. The conversational model module 300 then codes each relationship model as separate dialog nodes in the AI model, and also codes continued conversation as an extension to dialog nodes for the negative query types.

Figure 4:
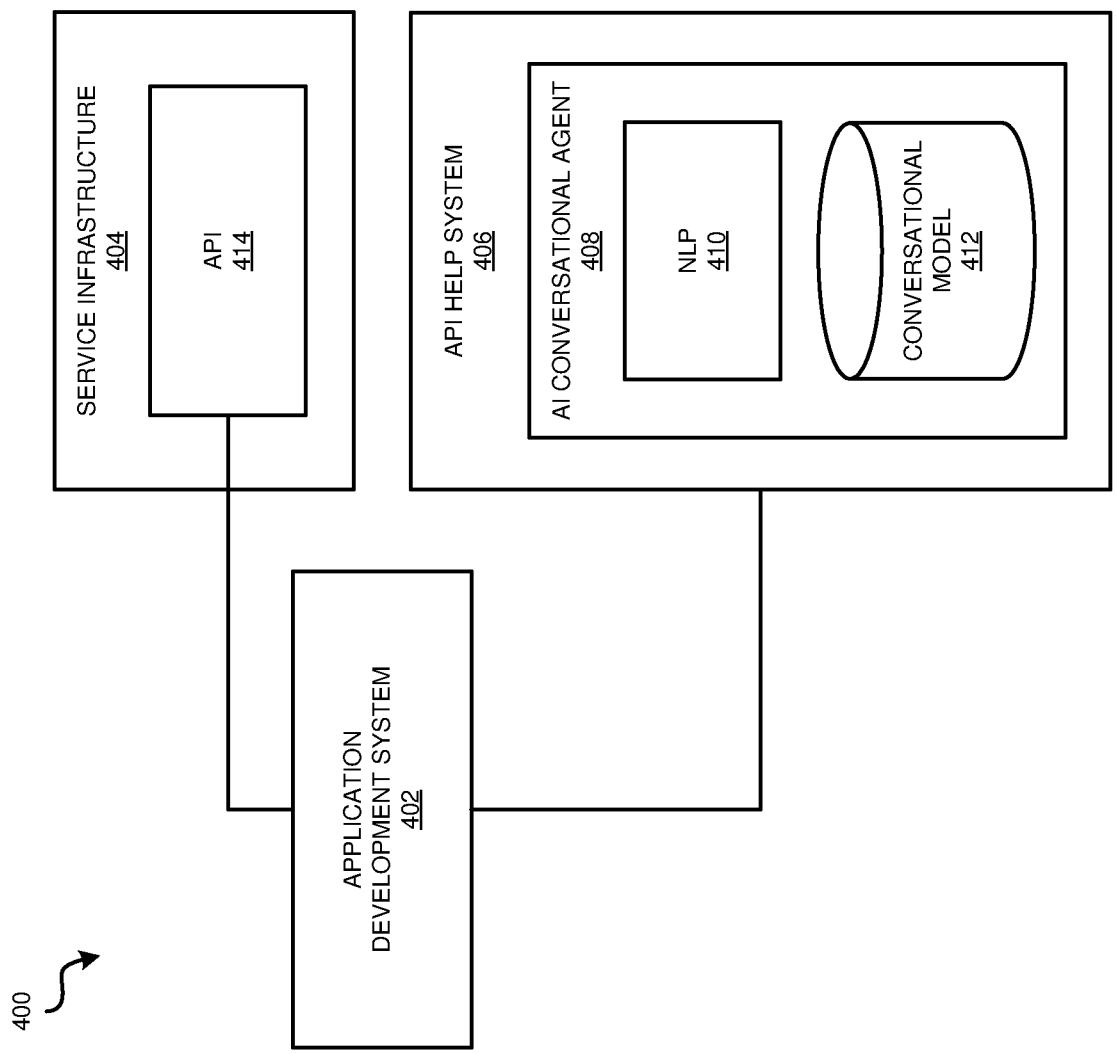
FIG. 4 depicts a block diagram of an example application development environment in accordance with an illustrative embodiment.

With reference to FIG. 4, this figure depicts a block diagram of an example application development environment 400 in accordance with an illustrative embodiment. The application development environment 400 includes an API help system 406 that provides various forms of assistance to developers using an application development system 402 to develop an application using the API 414. The API help system 406 allows developers to chat with an AI conversational agent 408 as one form of assistance. The conversational agent 408 includes a conversational model 412 that has been generated using API test data and NLP processing 410 according to concepts disclosed herein. In an exemplary embodiment, the conversational model 412 is an example of the conversational model 310 of FIG. 3.

Figure 5:
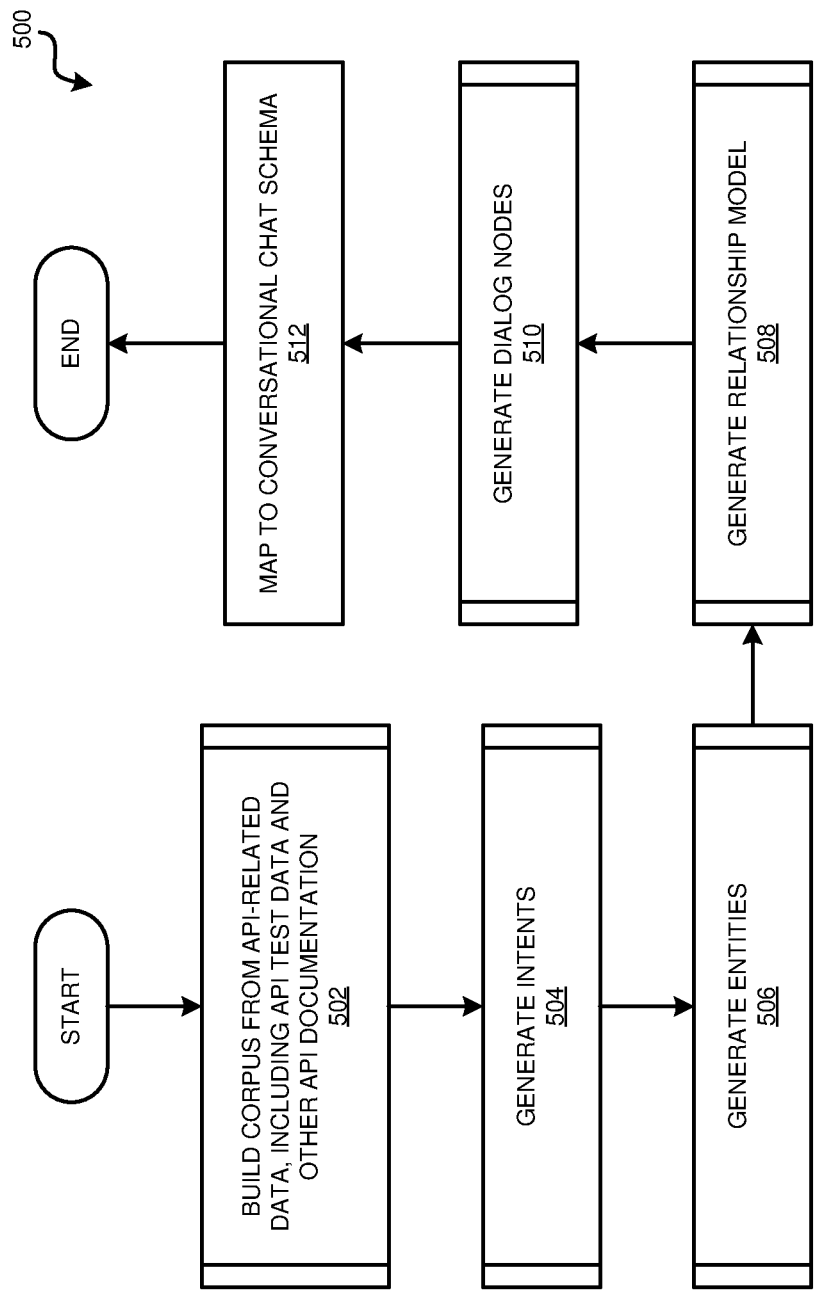
FIG. 5 depicts a flowchart of an example process for automated generation of an AI conversation model in accordance with an illustrative embodiment.

With reference to FIG. 5, this figure depicts a flowchart of an example process 500 for automated generation of an AI conversation model in accordance with an illustrative embodiment. In a particular embodiment, the conversational model module 200 of FIGS. 1 and 2 or the conversational model module 300 of FIG. 3 carries out the process 500.

Figure 6:
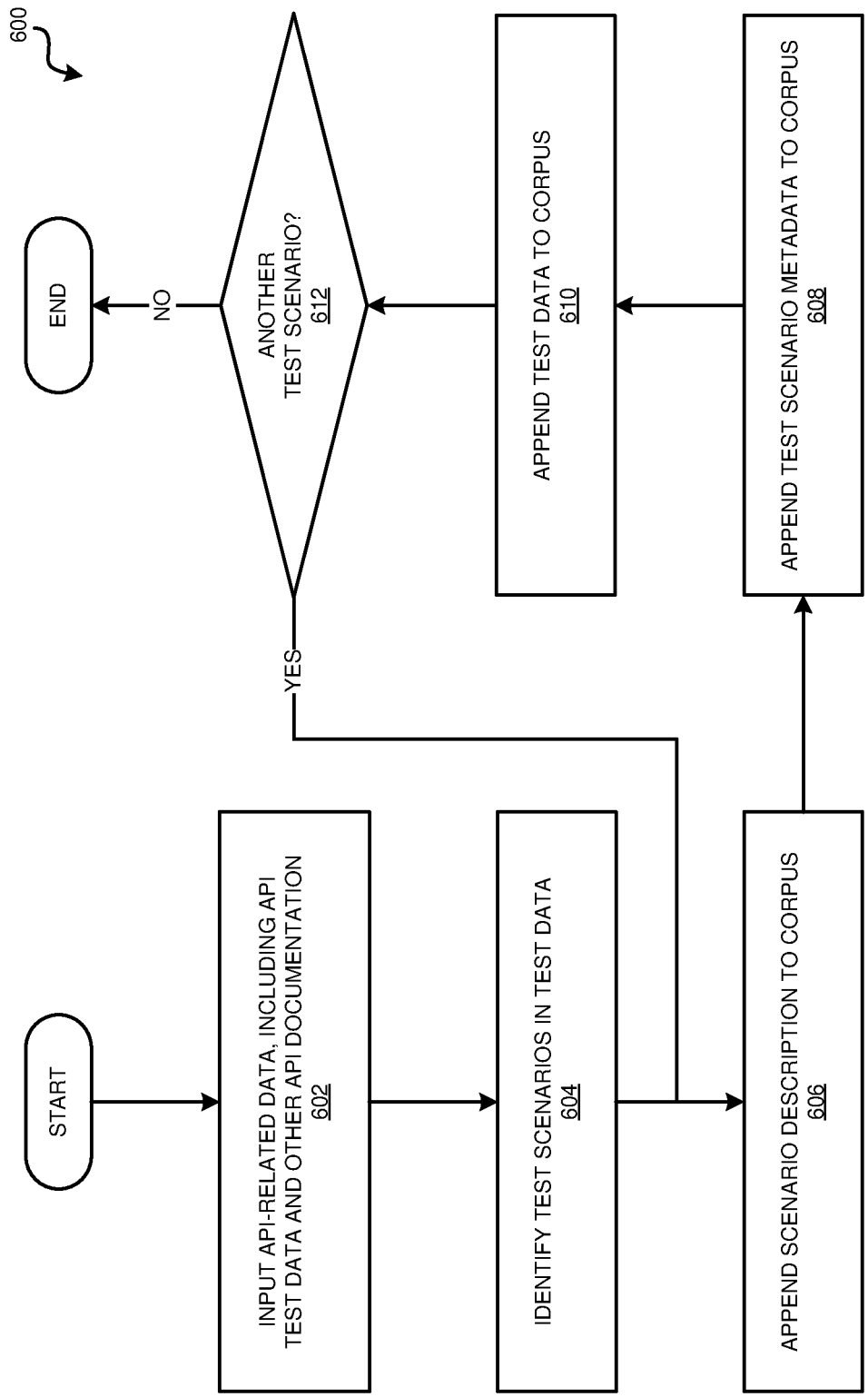
FIG. 6 depicts a flowchart of an example process for building a corpus from API test reports and other documentation in accordance with an illustrative embodiment.
Figure 7:
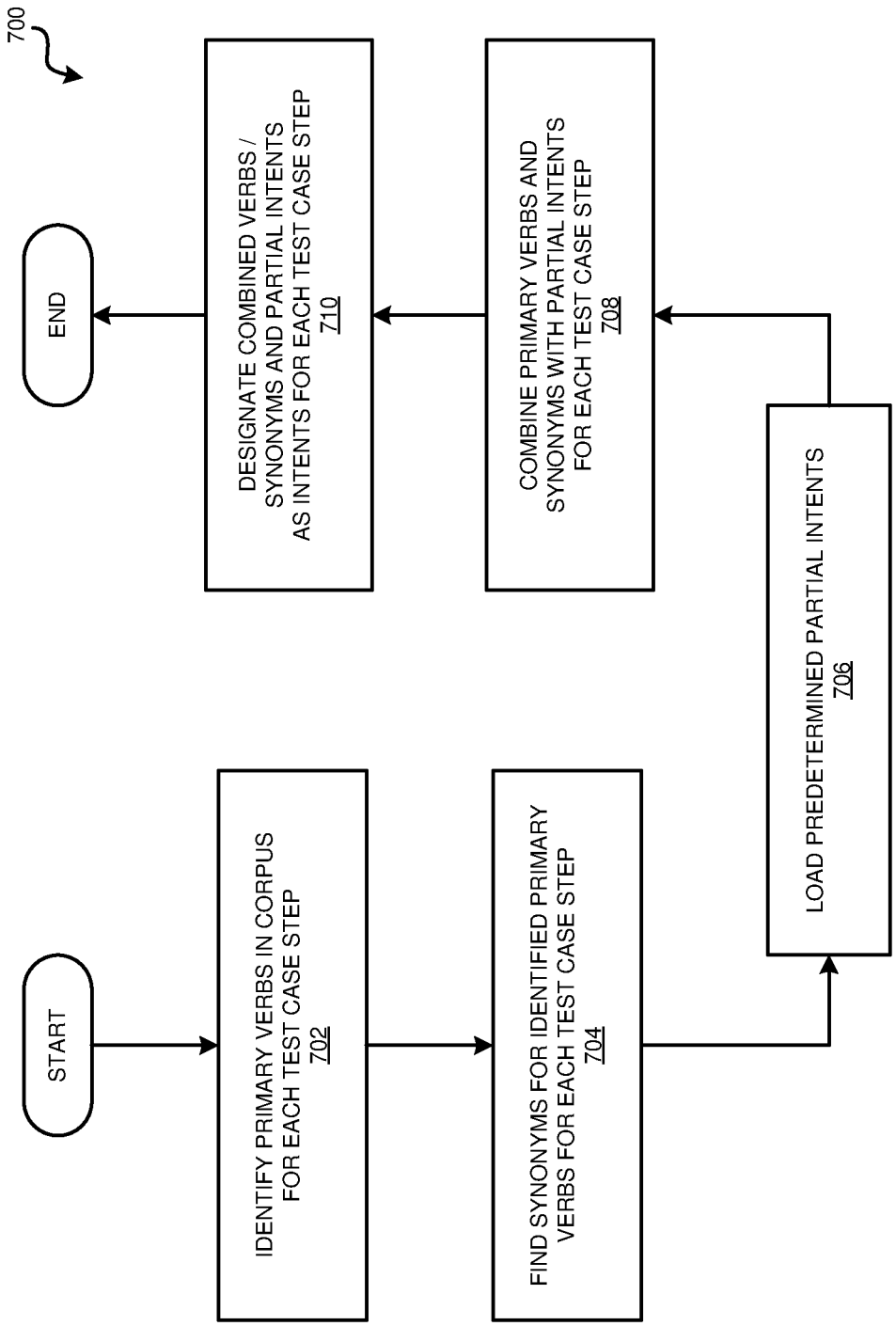
FIG. 7 depicts a flowchart of an example process for automated generation of intents in accordance with an illustrative embodiment.
Figure 8:
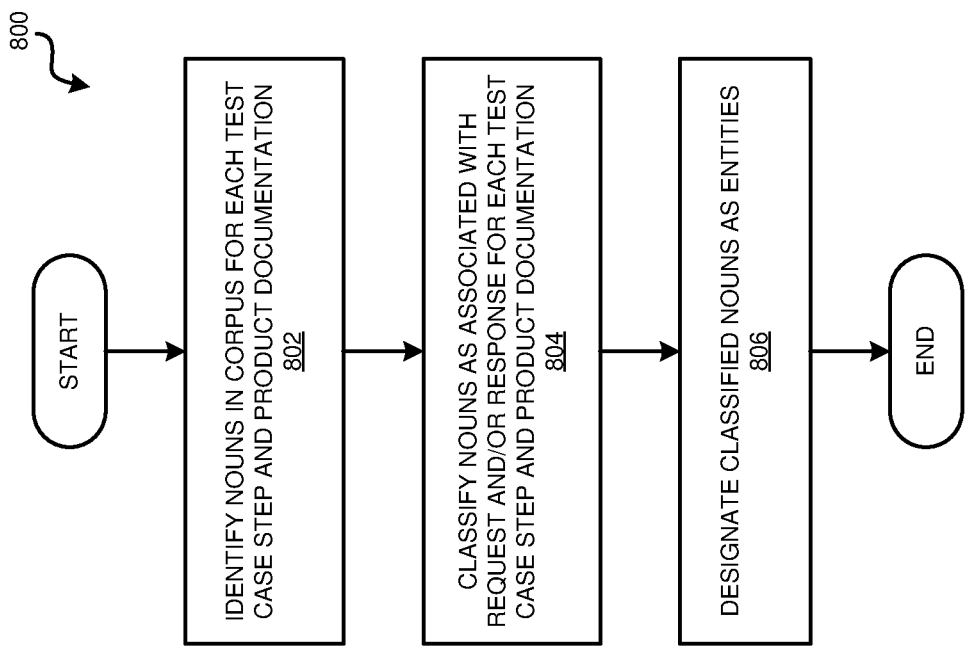
FIG. 8 depicts a flowchart of an example process for automated generation of entities in accordance with an illustrative embodiment.
Figure 9:
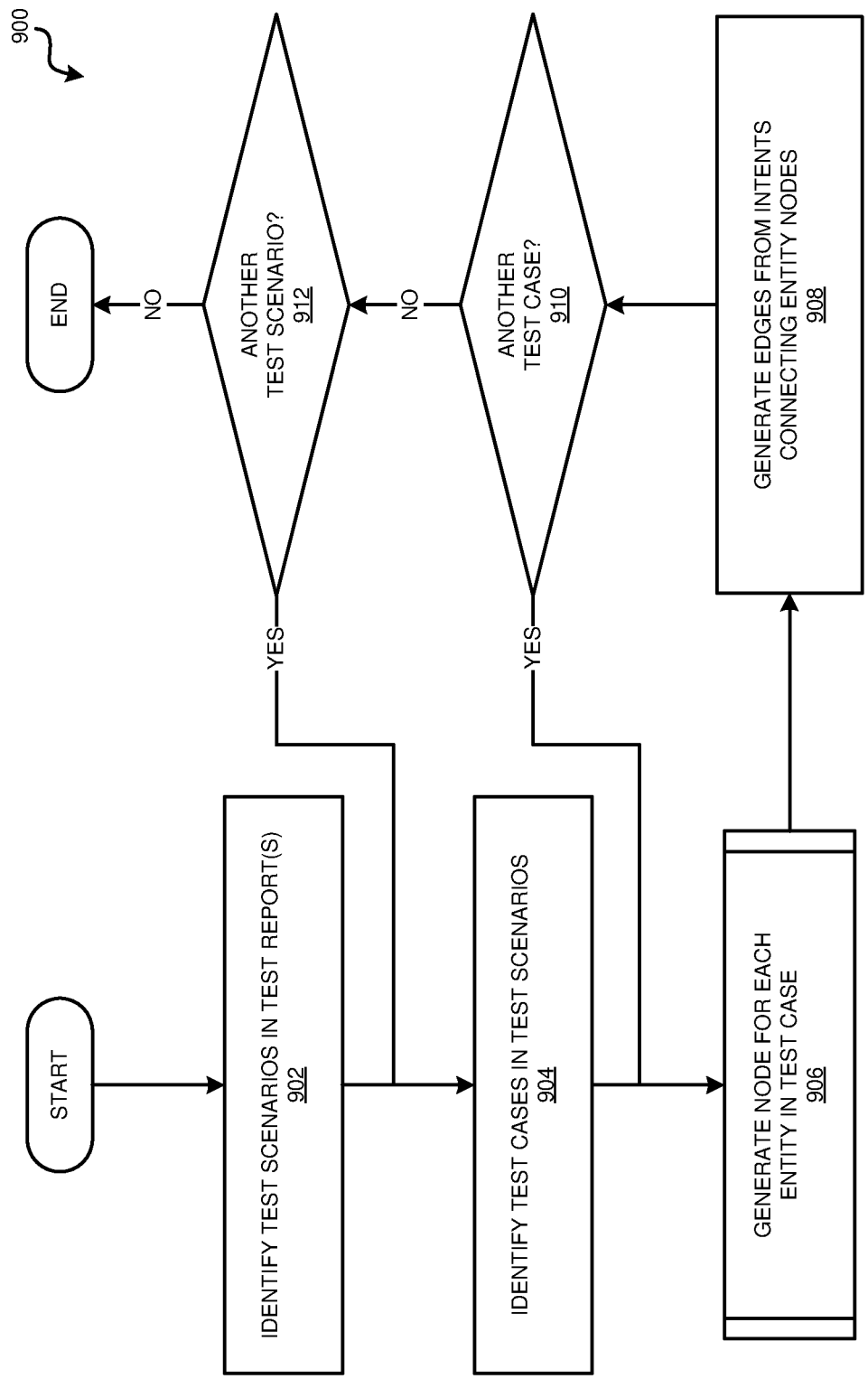
FIG. 9 depicts a flowchart of an example process for automated generation of a relationship model in accordance with an illustrative embodiment.

At block 502, the process builds a corpus from API-related data, including API test data and other API documentation. In some embodiments, the process 600 of FIG. 6 is performed at block 502. Next, at block 504, the process generates intents from the API-related data ingested at block 502. In some embodiments, the process 700 of FIG. 7 is performed at block 504. Next, at block 506, the process generates entities from the API-related data ingested at block 502. In some embodiments, the process 800 of FIG. 8 is performed at block 504. Next, at block 508, the process generates a relationship model using the intents from block 504 and the entities from block 506 along with test cases from the API-related data ingested at block 502. In some embodiments, the process 900 of FIG. 9 is performed at block 508. Next, at block 510, the process generates dialog nodes from the relationship model generated at block 508. In some embodiments, one or more of the process 1400 of FIG. 14, process 1500 of FIG. 15, and process 1600 of FIG. 16 is performed at block 510. Finally, at block 512, the process maps the dialog nodes generated at block 510 to a conversational chat schema of an AI conversation agent.

With reference to FIG. 6, this figure depicts a flowchart of an example process 600 for building a corpus from API test reports and other documentation in accordance with an illustrative embodiment. In a particular embodiment, the process 600 is an example of the block 502 of FIG. 5.

Next, at block 602, the process inputs API-related data. In various embodiments, the API-related data may include API test data and/or other types of API documentation, such as an API specification, API metadata, and/or other types of descriptions or information about the API.

Next, at block 604, the process identifies test scenarios in the API-related data. A test scenario refers to a collection of one or more API test cases. Operational testing is usually performed on an API before the API is released to the public. A common technique for API testing involves the use of test scenarios. A test scenario is a series of steps a user may take to complete a task, and usually includes positive cases in which a user takes the expected actions and negative cases in which a user does not take the expected steps.

In the case of an API, the series of steps will include one or more API service calls. One technique is to create a separate test case for each service call being tested, and then group the test cases according to related service calls into test scenarios. In other situations, more than one service call may be included in a test case.

The test cases and test scenarios are typically documented, for example, in a test specification that includes test data and metadata. The test specification includes a list of test scenarios, and for each test scenario, a description of the scenario and a number of test cases. Then, for each test case, the test specification may include a description, pre-conditions that need to be met before executing the test case, a list of test steps in the order they should be executed, data that is needed as an input for test cases, expected results, and post conditions that should be achieved by the test. In some embodiments, the process at block 604 includes NLP parsing of the test specification to identify test scenarios and test cases.

A sequence is then created for each test case. The sequence specifies a series of operations associated with the service call. As a non-limiting example, a test scenario may be created for service calls used for setting up a new project that involves a service call for creating the project and another service call for creating a new member of the project. In this example, a first test case is created for the service call that is used to create the new project, and a second test case is created for the service call that is used to create the new member of the project. This example may then have a sequence that includes issuing a GET request with a project name to the API, then receiving an HTTP status 201 response with the project name and a project ID. This test case may be grouped into a test scenario with another test case for creating a new member of the project.

For this example, the process at block 604 would identify this and other scenarios in the API-related data using NLP processing. Then, blocks 606-612 are repeated for each identified scenario, where at block 606 the process appends the scenario description to the corpus, at block 608 the process appends test scenario metadata to the corpus, at block 610 the process appends test data to the corpus, and at block 612 the process loops back to block 606 until each scenario has been processed. In some embodiments, the process may only perform one or two of blocks 606-610 depending on how the test specification and other information is formatted.

With reference to FIG. 7, this figure depicts a flowchart of an example process 700 for automated generation of intents in accordance with an illustrative embodiment. In a particular embodiment, the process 700 is an example of the block 504 of FIG. 5.

At block 702, the process identifies primary verbs in the corpus for each test case step. In some embodiments, block 702 includes using NLP processing to identify parts of speech of words in the corpus. In some embodiments, block 702 includes tokenizing the corpus, which involves converting a sequence of characters into a sequence of tokens. Tokens may be string of characters typed by a user and categorized as a meaningful symbol. Further, in certain embodiments, tokenizing includes identifying word boundaries in the corpus and breaking sentences into their component parts such as words, multiword tokens, numbers, and punctuation marks. In some embodiments, the tokenizing includes receiving a string of characters, identifying the lexemes in the string, and categorizing them into tokens.

In some embodiments, block 702 includes part-of-speech (POS) tagging in which the process marks up a word in the corpus to correspond to a particular part of speech. In some embodiments, the POS tagging includes assigning a part of speech to each word or other token in the corpus. In some embodiments, the POS tagging includes determining the part of speech to which a word corresponds based on the definition of the word and the context of the word. The context of a word may be based on its relationship with adjacent and related words in a phrase, sentence, question, or paragraph. In certain embodiments, the context of a word may be dependent on one or more previous words. Examples of parts of speech that may be assigned to words include, but are not limited to, nouns, verbs, adjectives, adverbs, and the like. Examples of other part of speech categories that the process may assign include, but are not limited to, comparative or superlative adverbs, wh-adverbs, conjunctions, determiners, negative particles, possessive markers, prepositions, wh-pronouns, and the like.

Next, at block 704, the process finds synonyms for identified primary verbs for each test case step. In some embodiments, block 704 includes deriving synonyms for verbs using synonym network tools of WordNet and VerbNet of the Natural Language Toolkit (NLTK).

Next, at block 706, the process loads a predetermined list of partial intents. The predetermined list of partial intents includes a static list of basic intents (without a primary verb) for intent generation. A non-limiting example of a basic intents list may include:
How to
Example for
Failing with
Getting error
Not working The list of partial intents includes several phrases that a user may uses to begin a question. While five examples are shown, actual implementations may include dozens or hundreds of such phrases. In some embodiments, this list will be absorbed into the corpus as a dictionary or preloaded template.

Next, at block 708, the process combines the primary verbs and synonyms from blocks 702 and 704 with the partial intents for each test case step, and at block 710 the resulting combinations are designated as intents for the model being generated.

With reference to FIG. 8, this figure depicts a flowchart of an example process 800 for automated generation of entities in accordance with an illustrative embodiment. In a particular embodiment, the process 800 is an example of the block 506 of FIG. 5.

At block 802, the process identifies nouns in the corpus for each test case step. In some embodiments, the NLP processing described in connection with block 702 of FIG. 7 is also used to identify nouns in the corpus.

Next, at block 804, the process classifies nouns as being associated with request and/or response for each test case step. In some embodiments, the NLP processing includes determining a context of a noun based on surrounding words, and then classify the context as request or response for each step. Then at block 806, the process designates the classified nouns as entities for the model being generated.

With reference to FIG. 9, this figure depicts a flowchart of an example process 900 for automated generation of a relationship model in accordance with an illustrative embodiment. In a particular embodiment, the process 900 is an example of the block 508 of FIG. 5.

Next, at block 902, the process identifies test scenarios in test report(s), and at block 904 the process identifies test cases. In some embodiments, the process described in connection with block 604 of FIG. 6 is also used to identify scenarios in block 902 and text cases in block 904.

Figure 10:
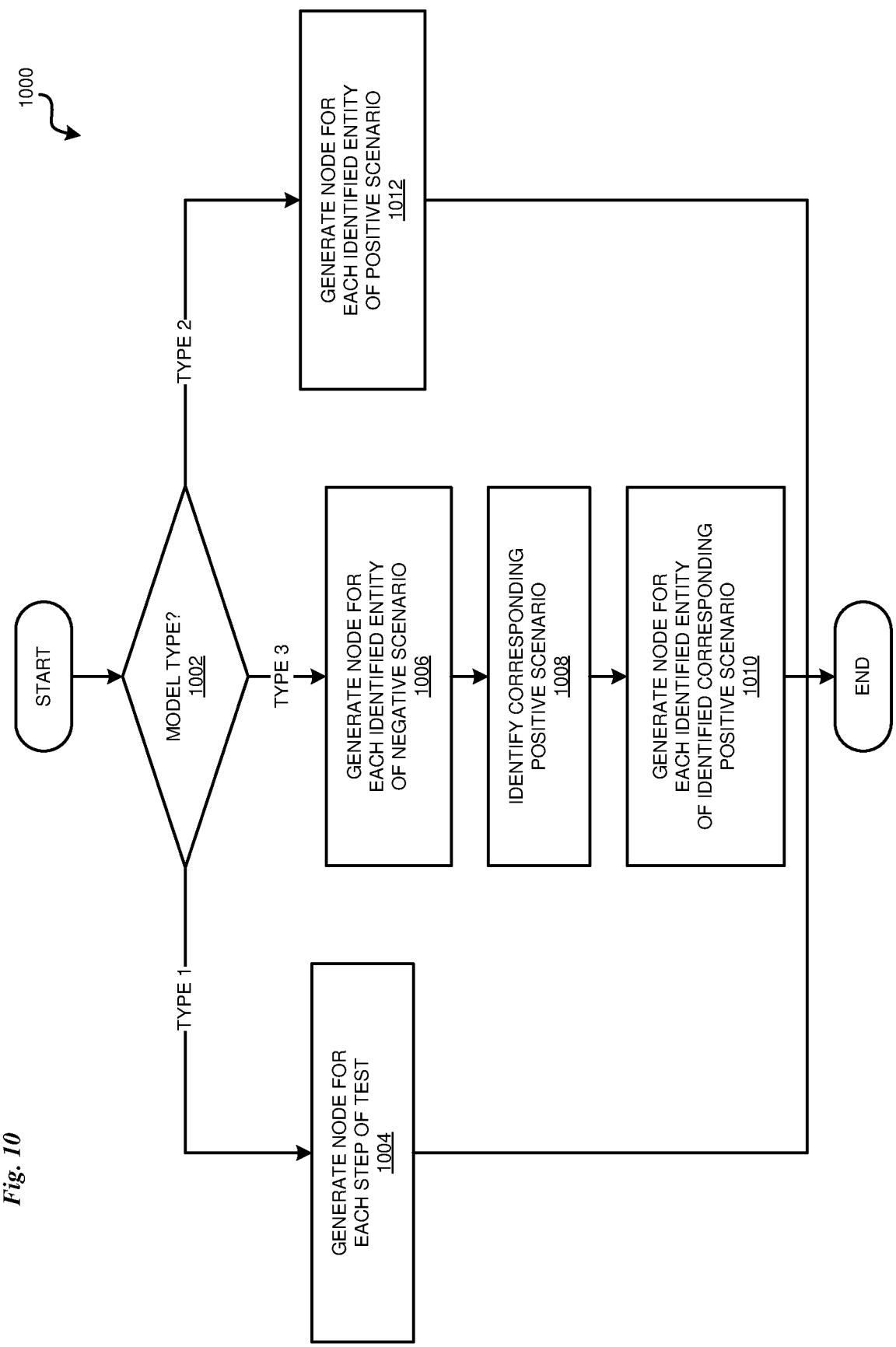
FIG. 10 depicts a flowchart of an example process for automated generation of entity nodes for API test cases in accordance with an illustrative embodiment.

Then, blocks 906-912 are repeated for each identified scenario, with blocks 906-910 being repeated for each test case of each scenario. At block 906, the process generates a node for each entity in the present test case. In some embodiments, the process 1000 of FIG. 10 is performed at block 906. Next, at block 908, the process generates edges from intents connecting the entity nodes. Then, at block 910, the process loops back to block 906 until each test case of a present scenario has been processed, and then at block 912, the process loops back to block 904 until each scenario has been processed.

With reference to FIG. 10, this figure depicts a flowchart of an example process 1000 for automated generation of entity nodes for API test cases in accordance with an illustrative embodiment. In a particular embodiment, the process 1000 is an example of the block 906 of FIG. 9.

At block 1002, the process determines a model type of the current relationship model being generated. In some embodiments, the relationship model being generated may be capable of responding to multiple types of queries. For example, in the illustrated embodiment, the relationship model is being generated to be capable of responding to the query types described in Table 1 above. Then, nodes of the relationship model are generated depending on the query type. For Type 1, block 1004 is performed; for Type 2, block 1012 is performed, and for Type 3, blocks 1006-1010 are performed.

For Type 1, at block 1004, the process generates a node for each step of the test of the current test case being processed.

For Type 2, at block 1012, the process generates a node for each identified entity of the positive scenario for the current test case being processed.

For Type 3, at block 1006, the process generates a node for each identified entity of the negative scenario for the current test case being processed. Next, at block 1008, the process identifies the corresponding positive scenario for the current test case being processed. Next, at block 1010, the process generates a node for each identified entity of the identified corresponding positive scenario.

Figure 11:
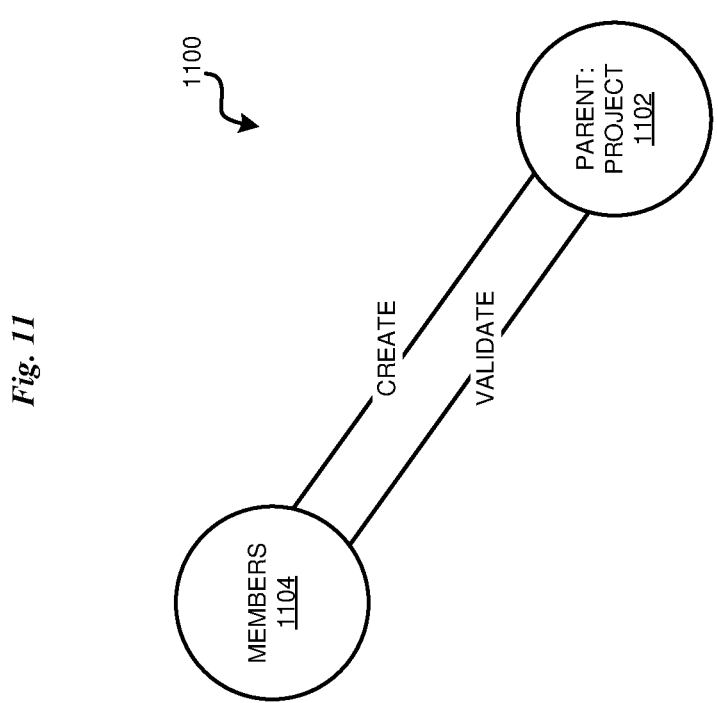
FIG. 11 depicts a Type 1 relationship model in accordance with an illustrative embodiment.

With reference to FIG. 11, this figure depicts a relationship model 1100 in accordance with an illustrative embodiment. In a particular embodiment, the relationship model 1100 has a graph structure resulting from generating a Type 1 relationship model according to the process 900 of FIG. 9 and the process 1000 of FIG. 10.

In the illustrated embodiment, the relationship model 1100 is based on a non-limiting example scenario involving three steps: (1) create project; (2) create a member; and (3) validate the member. The nodes are created from the entities (project and member), so the relationship model 1100 for this example includes a project node 1102 and a members node 1104. In the illustrated embodiment, each node has a value or a key: value pair stored in node metadata where the value corresponds with an entity and the key corresponds to a node type (i.e., parent or child node).

The intents (create, validate) are then used to create edges, where each edge connects two nodes. Each edge is representative of a relationship between the nodes it connects. The result as shown in FIG. 11 is a create edge and a validate edge, both connecting the project node 1102 and the members node 1104.

Figure 12:
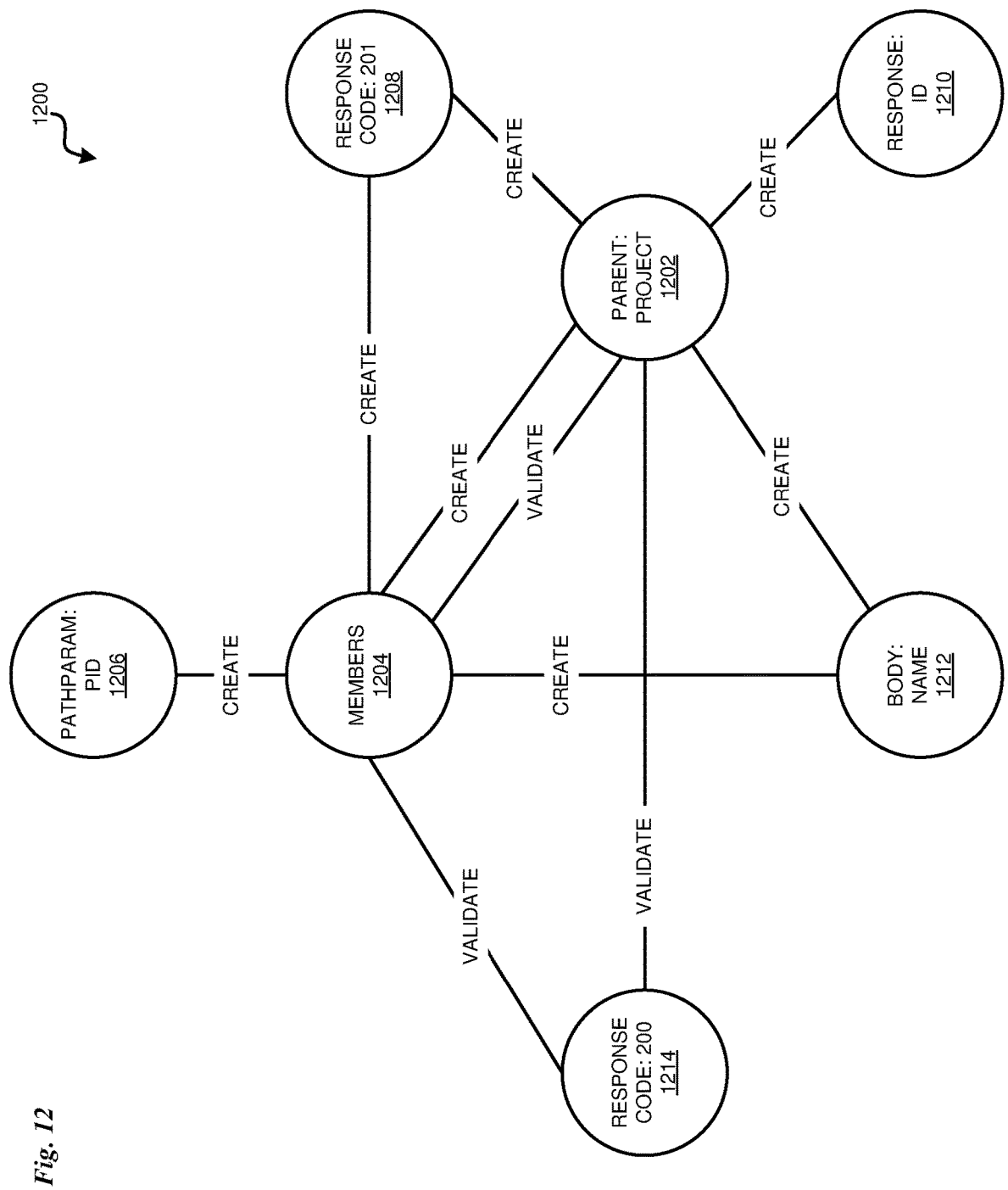
FIG. 12 depicts a Type 2 relationship model in accordance with an illustrative embodiment.

With reference to FIG. 12, this figure depicts a relationship model 1200 in accordance with an illustrative embodiment. In a particular embodiment, the relationship model 1200 has a graph structure resulting from generating a Type 2 (positive scenario) relationship model according to the process 900 of FIG. 9 and the process 1000 of FIG. 10. In the illustrated embodiment, the relationship model 1200 is based on a non-limiting example scenario involving test case steps, intents, and entities shown in Table 2 above.

The nodes are created from the entities, so the relationship model 1200 for this example includes A project node 1202, a members node 1204, a PID node 1206, a response code node 1208, an ID node 1210, a name node 1212, and a response code node 1214. In the illustrated embodiment, each node has a value or a key:value pair stored in node metadata where the value corresponds with an entity and the key corresponds to a node type (i.e., parent or child node).

The intents from Table 3 are then used to create edges, where each edge connects two nodes. Each edge is representative of a relationship between the nodes it connects. The result relationship model 1200 is shown in FIG. 12.

Figure 13:
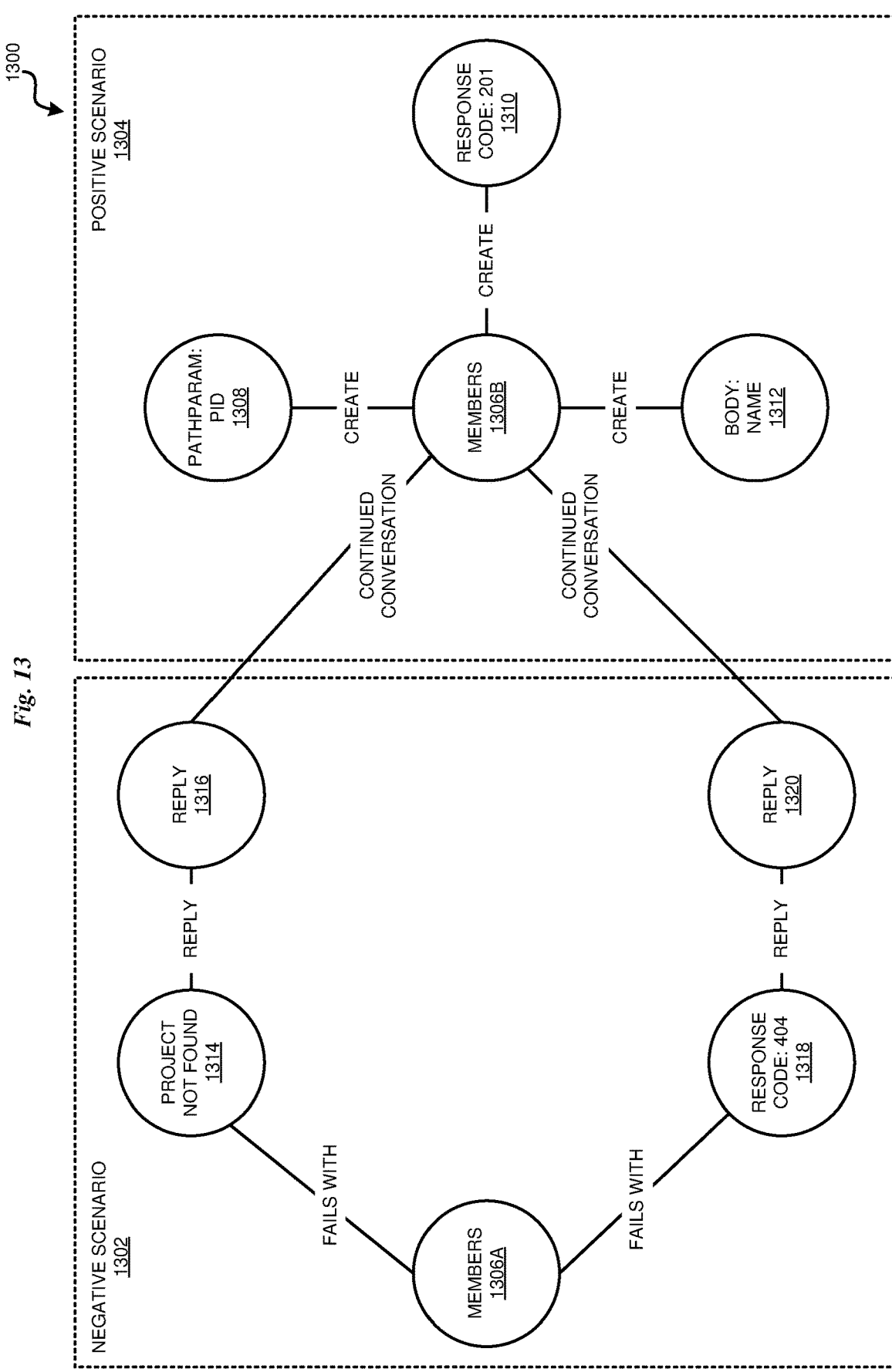
FIG. 13 depicts a Type 3 relationship model in accordance with an illustrative embodiment.

With reference to FIG. 13, this figure depicts a relationship model 1300 in accordance with an illustrative embodiment. In a particular embodiment, the relationship model 1300 has a graph structure resulting from generating a Type 3 (negative scenario) relationship model according to the process 900 of FIG. 9 and the process 1000 of FIG. 10. In the illustrated embodiment, the relationship model 1300 is based on a non-limiting example scenario involving test case steps, intents, and entities shown in Table 3 above.

For the Type 3 negative scenario, the relationship model 1300 is arranged to provide a reason for the failure and steps to execute the case successfully. This is accomplished by creating a negative scenario model 1302 as a base, and then extending the relationship to the corresponding positive scenario model 1304. The nodes of the negative scenario model 1302 are created from the entities of the negative scenario in Table 4, so the negative scenario model 1302 for this example includes a members node 1306A, a project not found node 1314, a reply node 1316, a response code node 1318, and a reply node 1320.

The project not found node 1314 and the response code node 1318 are examples of errors that may occur when a user attempts to create a member, such as shown for the Type 3 query in Table 4. The project not found node 1314 and response code node 1318 are therefore connected to the members node 1306A by respective edges that are generated from error intents (e.g., "FAILS WITH" intents) from Table 4. The reply node 1316 and the reply node 1320 are associated with fixed responses that are added for use by the conversational bot in response to the respective types of errors. For example, the reply node 1320 may be provided with the following fixed response message shown in Table 4: "The reason for 404 could be PROJECT_NOT_FOUND. This would happen when the member is created with an invalid project or a project ID that does not exist." Then the edge from reply node 1320 connects to members node 1306B for "continued conversation" where, as indicated in Table 4, the conversational bot then proceeds to describe the correct process to create a Member (for example, as indicated by the explanation following "Continued reply" in Table 4) as would be generated for a Type 2 query for the positive scenario. The relationship model 1300 thus allows the conversational bot to assist a developer in debugging an API application by explaining an error ("The reason for service infrastructure 404 . . . ") and then providing an explanation of a correct usage ("To create a member in a project, create . . . ").

Thus, as shown in FIG. 13, the relationship model 1300 includes the positive scenario model 1304 (the partial view of the positive scenario model 1304 shown in FIG. 13 may be the same as the relationship model 1200 of FIG. 12) for the corresponding positive model (for the members entity). The positive scenario model 1304 includes the corresponding members node 1306B, a PID node 1308, a response code node 1310, and a name node 1312. In the illustrated embodiment, each node has a value or a key:value pair stored in node metadata where the value corresponds with an entity and the key corresponds to a node type (i.e., parent or child node).

The intents from Table 4 are thus used to create edges for the negative scenario model 1302 and intents from Table 3 are used to create edges for the positive scenario model 1304. Additional edges are then created to extend from the negative scenario model 1302 to the positive scenario model 1304 for the continued conversational bot to suggest a solution to the problem. The result relationship model 1300 is shown in FIG. 13. 200

Figure 14:
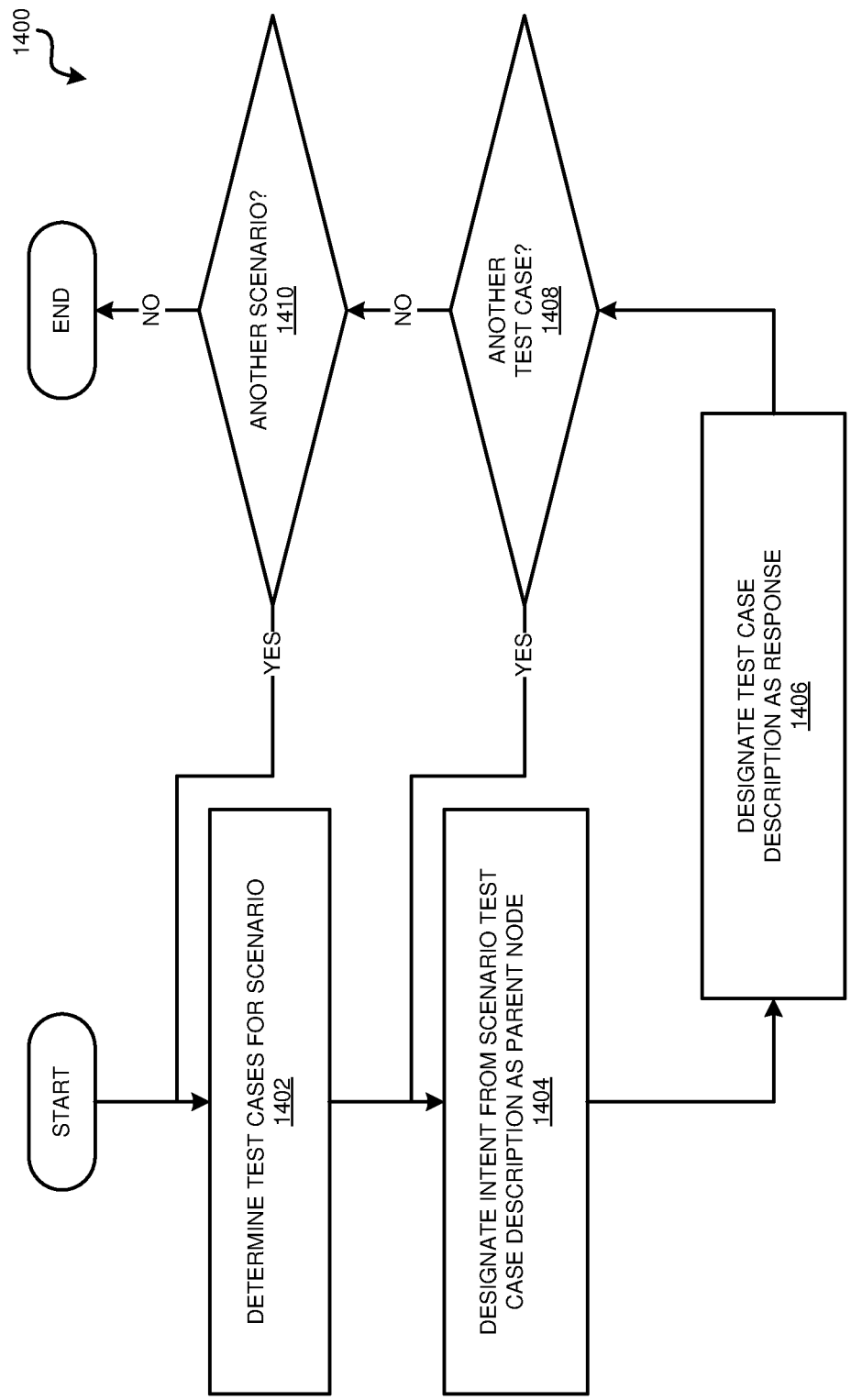
FIG. 14 depicts a flowchart of an example process for automated generation of dialog nodes of a conversation model in accordance with an illustrative embodiment.

With reference to FIG. 14, this figure depicts a flowchart of an example process 1400 for automated generation of dialog nodes of a conversation model in accordance with an illustrative embodiment. In a particular embodiment, the process 1400 is an example of the block 510 of FIG. 5 for a Type 1 relationship model.

At block 1402, the process determines test cases for scenarios. In some embodiments, the process described in connection with block 604 of FIG. 6 is also used to identify test cases and scenarios in block 1402. Then, blocks 1402-1410 are repeated for each identified scenario, with blocks 1404-1408 being repeated for each test case of each scenario.

At block 1404, the process designates an intent from the scenario test case description as a parent node. Then, at block 1406, the process designates the test case description as a response. Next, at block 1408, if there is another test case for the current scenario, the process returns to block 1404. Otherwise, at block 1410, if there is another scenario, the process returns to block 1402. Otherwise, the process ends.

Figure 15:
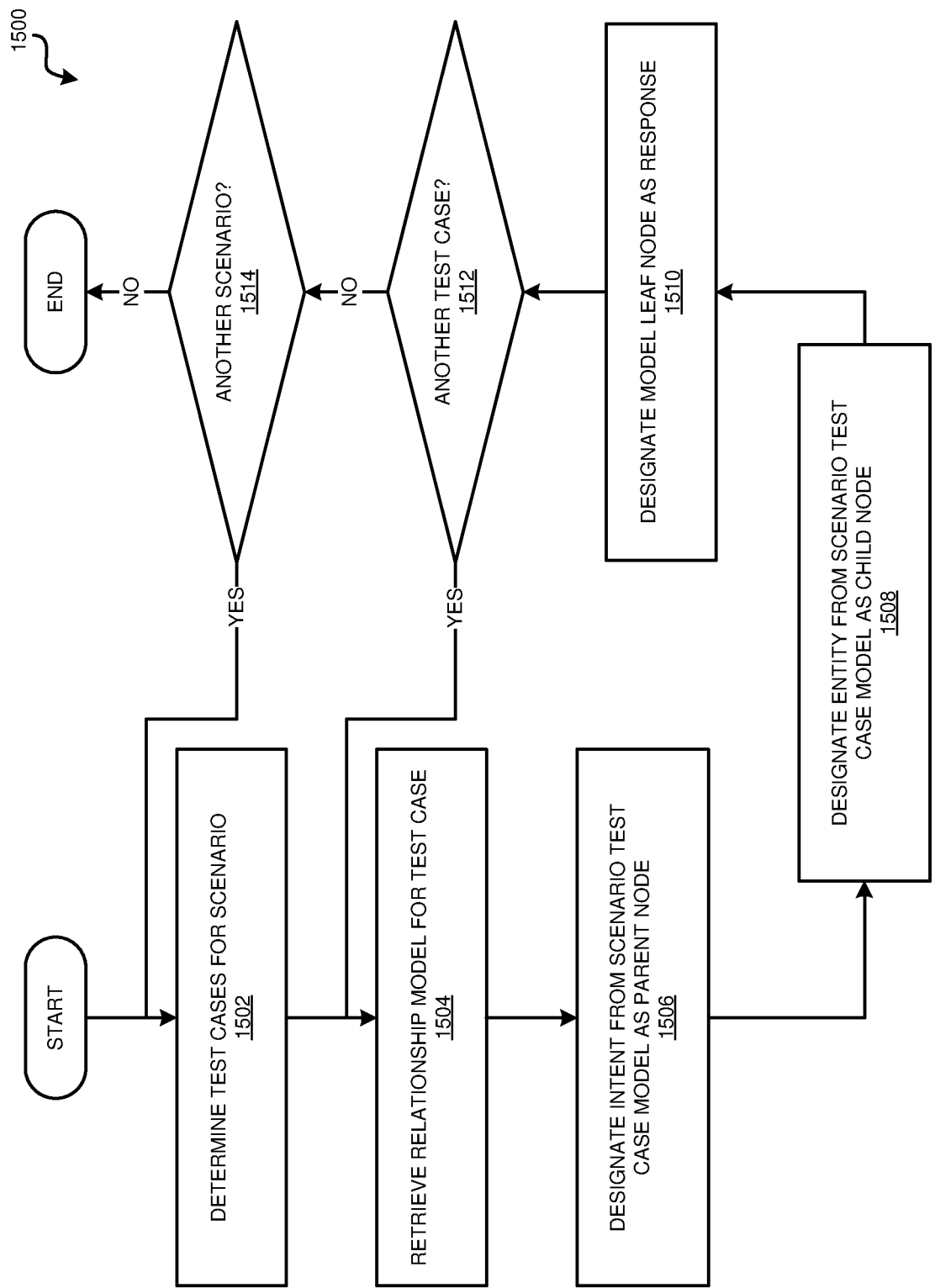
FIG. 15 depicts a flowchart of an example process for automated generation of dialog nodes of a conversation model in accordance with an illustrative embodiment.
Figure 16:
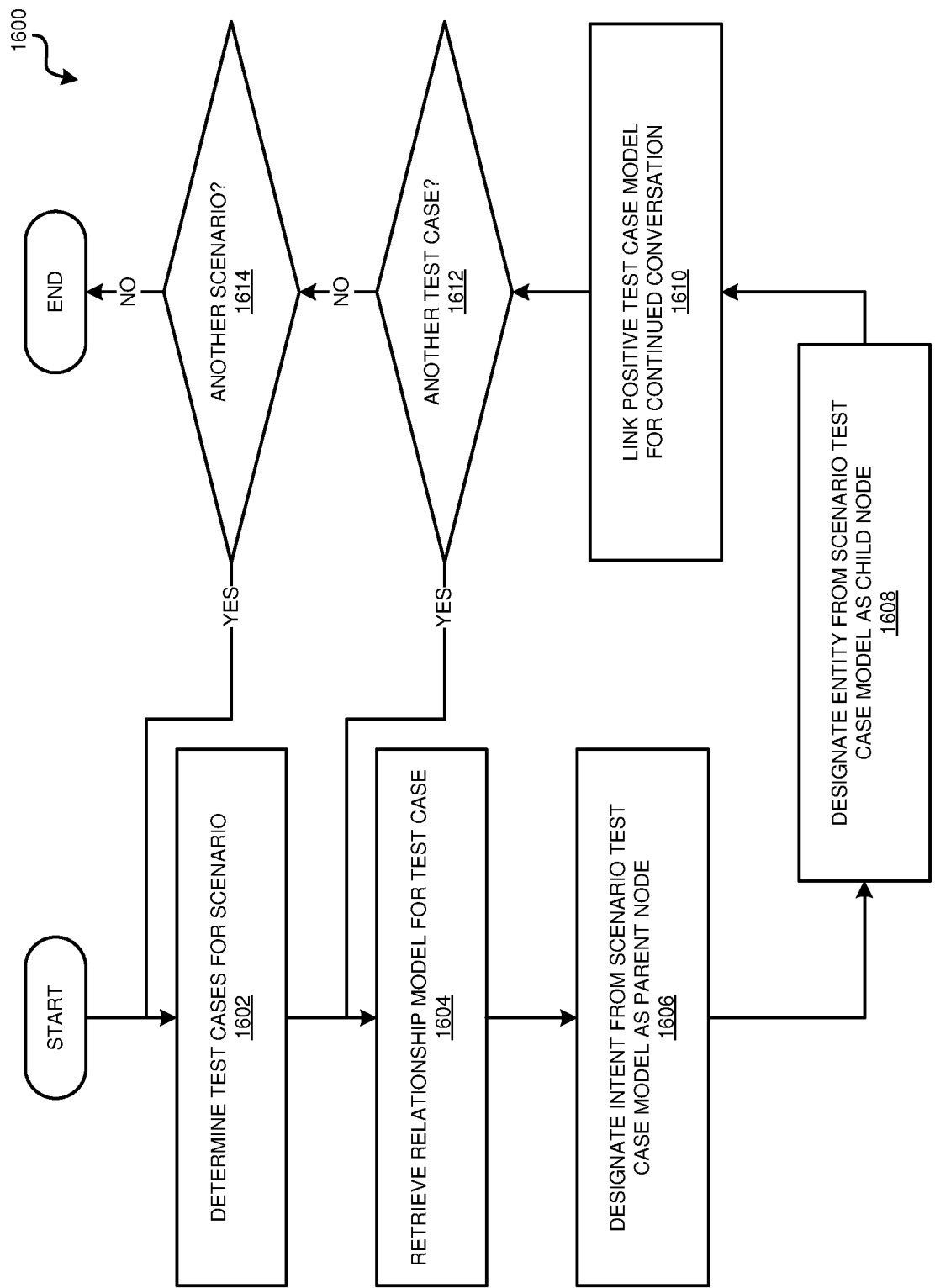
FIG. 16 depicts a flowchart of an example process for automated generation of dialog nodes of a conversation model in accordance with an illustrative embodiment.

With reference to FIG. 15, this figure depicts a flowchart of an example process 1500 for automated generation of dialog nodes of a conversation model in accordance with an illustrative embodiment. In a particular embodiment, the process 1500 is an example of the block 510 of FIG. 5 for a Type 2 relationship model.

At block 1502, the process determines test cases for scenarios. In some embodiments, the process described in connection with block 604 of FIG. 6 is also used to identify test cases and scenarios in block 1502. Then, blocks 1502-1514 are repeated for each identified scenario, with blocks 1504-1512 being repeated for each test case of each scenario.

At block 1504, the process retrieves the relationship model for the current test case. At block 1506, the process designates an intent from the scenario test case model as a parent node. Then, at block 1508, the process designates an entity from the scenario test case model as a child node, and at block 1510, the process designates a model leaf node as a response. Next, at block 1512, if there is another test case for the current scenario, the process returns to block 1504. Otherwise, at block 1514, if there is another scenario, the process returns to block 1502. Otherwise, the process ends.

With reference to FIG. 16, this figure depicts a flowchart of an example process 1600 for automated generation of dialog nodes of a conversation model in accordance with an illustrative embodiment. In a particular embodiment, the process 1500 is an example of the block 510 of FIG. 5 for a Type 3 relationship model.

At block 1602, the process determines test cases for scenarios. In some embodiments, the process described in connection with block 604 of FIG. 6 is also used to identify test cases and scenarios in block 1602. Then, blocks 1602-1614 are repeated for each identified scenario, with blocks 1604-1612 being repeated for each test case of each scenario.

At block 1604, the process retrieves the relationship model for the current test case. At block 1606, the process designates an intent from the scenario test case model as a parent node. Then, at block 1608, the process designates an entity from the scenario test case model as a child node. Next, at block 1610, the process links one or more nodes to the corresponding positive test case model for continued conversation. Next, at block 1612, if there is another test case for the current scenario, the process returns to block 1604. Otherwise, at block 1614, if there is another scenario, the process returns to block 1602. Otherwise, the process ends.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
    generating an intent representative of a verb identified in application programming interface (API) test data associated with an API test case;
    generating a first entity representative of a first noun identified in the API test data and a second entity representative of a second noun identified in the API test data associated with the API test case;
    identifying the intent as being associated with a relationship between the first entity and the second entity in the API test case;
    generating a first relationship model associated with the API test case, wherein the relationship model comprises the intent as the relationship between the first entity and the second entity; and
    generating a conversation model of an artificial intelligence (AI) conversation agent by mapping the intent and the first and second entities to dialog nodes of the conversation model.

2. The computer-implemented method according to claim 1, further comprising:
    parsing, by a processor using natural language processing, the API test data, wherein the parsing results include identification of the verb and identification of the first and second nouns.

3. The computer-implemented method according to claim 1, wherein the generating of the first relationship model comprises generating a parent node representative of the first entity, a child node representative of the second entity, and an edge representative of the intent, wherein the edge connects the parent node and the child node.

4. The computer-implemented method according to claim 1, further comprising:
    associating the first relationship model with a first query type;
    generating a second relationship model associated with the API test case; and
    associating the second relationship model with a second query type.

5. The computer-implemented method according to claim 4, further comprising:
    identifying the first and second entities as being part of an API request being tested by the API test case;
    generating a third entity representative of a third noun identified in the API test data; and
    identifying the third entity as being part of an expected response to the API request.

6. The computer-implemented method according to claim 5, wherein the generating of the second relationship model comprises:
    generating a parent node representative of the first entity, a first child node representative of the second entity, and a second child node representative of the third entity;
    generating a first edge representative of the intent connecting the parent node and the first child node; and
    generating a second edge representative of the intent connecting the first child node and the second child node.

7. The computer-implemented method according to claim 5, further comprising:
    generating a third relationship model associated with the API test case; and
    associating the third relationship model with a third query type.

8. The computer-implemented method according to claim 7, further comprising:
    generating a fourth entity representative of a fourth noun identified in the API test data; and
    identifying the fourth entity as being part of an error response to the API request.

9. The computer-implemented method according to claim 8, wherein the generating of the third relationship model comprises:
generating a first child node representative of the second entity, a second child node representative of the second entity, a third child node representative of the third entity, and a fourth child node representative of the fourth entity;
generating a first edge representative of an error intent connecting the first child node and the fourth child node; and
generating a second edge representative of the intent connecting the second child node and the third child node.

10. The computer-implemented method according to claim 9, wherein the generating of the third relationship model further comprises generating a path from the fourth child node to the second child node, wherein the path includes a reply associated with debugging information for the error response and wherein the path to the second child node provides for correct usage information for the error response.

11. A computer program product comprising one or more computer readable storage media, and program instructions collectively stored on the one or more computer readable storage media, the program instructions executable by a processor to cause the processor to perform operations comprising:
generating an intent representative of a verb identified in application programming interface (API) test data associated with an API test case;
generating a first entity representative of a first noun identified in the API test data and a second entity representative of a second noun identified in the API test data associated with the API test case;
identifying the intent as being associated with a relationship between the first entity and the second entity in the API test case;
generating a first relationship model associated with the API test case, wherein the relationship model comprises the intent as the relationship between the first entity and the second entity; and
generating a conversation model of an artificial intelligence (AI) conversation agent by mapping the intent and the first and second entities to dialog nodes of the conversation model.

12. The computer program product of claim 11, wherein the stored program instructions are stored in a computer readable storage device in a data processing system, and wherein the stored program instructions are transferred over a network from a remote data processing system.

13. The computer program product of claim 11, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
program instructions to meter use of the program instructions associated with the request; and
program instructions to generate an invoice based on the metered use.

14. The computer program product of claim 11, further comprising:
associating the first relationship model with a first query type;
generating a second relationship model associated with the API test case;
associating the second relationship model with a second query type;
generating a third relationship model associated with the API test case; and
associating the third relationship model with a third query type.

15. The computer program product of claim 14, further comprising:
identifying the first and second entities as being part of an API request being tested by the API test case;
generating a third entity representative of a third noun identified in the API test data;
identifying the third entity as being part of an expected response to the API request;
generating a fourth entity representative of a fourth noun identified in the API test data; and
identifying the fourth entity as being part of an error response to the API request.

16. The computer program product of claim 15, wherein:
the generating of the second relationship model comprises:
generating a parent node representative of the first entity, a first child node representative of the second entity, and a second child node representative of the third entity;
generating a first edge representative of the intent connecting the parent node and the first child node; and
generating a second edge representative of the intent connecting the first child node and the second child node; and
the generating of the third relationship model comprises:
generating a parent node representative of the first entity, a first child node representative of the second entity, and a second child node representative of the fourth entity;
generating a first edge representative of the intent connecting the parent node and the first child node; and
generating a second edge representative of the intent connecting the first child node and the second child node.

17. A computer system comprising a processor and one or more computer readable storage media, and program instructions collectively stored on the one or more computer readable storage media, the program instructions executable by the processor to cause the processor to perform operations comprising:
generating an intent representative of a verb identified in application programming interface (API) test data associated with an API test case;
generating a first entity representative of a first noun identified in the API test data and a second entity representative of a second noun identified in the API test data associated with the API test case;
identifying the intent as being associated with a relationship between the first entity and the second entity in the API test case;
generating a first relationship model associated with the API test case, wherein the relationship model comprises the intent as the relationship between the first entity and the second entity; and generating a conversation model of an artificial intelligence (AI) conversation agent by mapping the intent and the first and second entities to dialog nodes of the conversation model.

18. The computer system of claim 17, further comprising:
associating the first relationship model with a first query type;
generating a second relationship model associated with the API test case;
associating the second relationship model with a second query type;
generating a third relationship model associated with the API test case; and
associating the third relationship model with a third query type.

19. The computer system of claim 18, further comprising:
identifying the first and second entities as being part of an API request being tested by the API test case;
generating a third entity representative of a third noun identified in the API test data;
identifying the third entity as being part of an expected response to the API request;
generating a fourth entity representative of a fourth noun identified in the API test data; and
identifying the fourth entity as being part of an error response to the API request.

20. The computer system of claim 19, wherein:
the generating of the second relationship model comprises:
generating a parent node representative of the first entity, a first child node representative of the second entity, and a second child node representative of the third entity;
generating a first edge representative of the intent connecting the parent node and the first child node; and
generating a second edge representative of the intent connecting the first child node and the second child node; and
the generating of the third relationship model comprises:
generating a parent node representative of the first entity, a first child node representative of the second entity, and a second child node representative of the fourth entity;
generating a first edge representative of the intent connecting the parent node and the first child node; and
generating a second edge representative of the intent connecting the first child node and the second child node.

* * * * *